United States Patent

Okamura

Patent Number: 5,528,121
Date of Patent: Jun. 18, 1996

[54] STORAGE CAPACITOR POWER SUPPLY

[75] Inventor: Michio Okamura, Yokohama, Japan

[73] Assignee: JEOL Ltd., Tokyo, Japan

[21] Appl. No.: 249,120

[22] Filed: May 25, 1994

[30] Foreign Application Priority Data

May 28, 1993 [JP] Japan .................... 5-151554

[51] Int. Cl.$^6$ ........................................ H02J 7/04
[52] U.S. Cl. ........................................ 320/1; 320/39
[58] Field of Search ................... 320/1, 22, 23, 320/24, 39; 361/502; 323/282, 284, 288, 304, 318, 349

[56] References Cited

U.S. PATENT DOCUMENTS

| | | | |
|---|---|---|---|
| 4,513,167 | 4/1985 | Brandstetter | 320/16 |
| 5,041,776 | 8/1991 | Shirata et al. | 320/1 |
| 5,063,340 | 11/1991 | Kalenowsky | 320/1 |
| 5,119,010 | 6/1992 | Shirata et al. | 320/1 |
| 5,161,094 | 11/1992 | Bruder et al. | 320/15 |
| 5,164,652 | 11/1992 | Johnson et al. | 320/2 |
| 5,274,321 | 12/1993 | Matsuda | 320/31 |
| 5,304,915 | 4/1994 | Sanpei et al. | 320/14 |
| 5,369,351 | 11/1994 | Adams | 320/16 |
| 5,387,857 | 2/1995 | Honda et al. | 320/18 |

*Primary Examiner*—Peter S. Wong
*Assistant Examiner*—K. Shin
*Attorney, Agent, or Firm*—Webb Ziesenheim Bruening Logsdon Orkin & Hanson

[57] ABSTRACT

A storage capacitor power supply adapted to be used as a power source for an electric vehicle. The storage capacitor power supply is equipped with a charging control circuit which stops charging when the voltage developed across the terminals of the capacitors reaches a given value. The charging control circuit can switch this voltage between at least two levels. In a power mode, the voltage is set to a higher value. In a long-life mode, the voltage is set of a lower value.

15 Claims, 2 Drawing Sheets

STORAGE CAPACITOR POWER SUPPLY

FIELD OF THE INVENTION

The present invention relates to a storage capacitor power supply and, more particularly, to a storage capacitor power supply consisting of large capacity electric double layer capacitors used as the power source of an electric vehicle or the like.

BACKGROUND OF THE INVENTION

An electric double layer capacitor uses activated carbon as the material of the electrodes. The activated carbon has a large specific surface and is electrochemically inactive. The electrodes are combined with an electrolyte to provide a large electric double layer capacitance. The electric double layer capacitor makes use of this large electric double layer capacitance. Therefore, it is expected that such electric double layer capacitors will act as power sources of electric vehicles or other vehicles producing no exhaust gas in the future.

When a voltage is applied between the electrodes of an electric double layer capacitor, two serially connected electric double layers are formed and the capacitor is charged. However, if the voltage exceeds the decomposition voltage of the electrolyte, then an electrical current begins to flow between the electrodes.

Accordingly, the working voltage of an electric double layer capacitor depends on the decomposition voltage of the electrolyte being used. It is said that the dielectric strength is about 1.2 volts where the electrolyte is an aqueous solution and about 5 volts where the electrolyte is a non-aqueous solution. Presently, commercially available electric double layer capacitors have maximum working voltages of 0.5 to 2.8 volts per unit cell and capacitances of several farads. The internal resistances vary widely, from about 0.1 to 100 $\Omega$. A recently published prototype of an electric double layer capacitor has a maximum working voltage of 2.5 volts, a capacitance of 240 farads and an internal resistance of about 0.1 $\Omega$.

When such a large capacity electric double layer capacitor is charged with its maximum permissible voltage to use the capacitor in power applications, the electrode material and the electrolyte are decomposed by electrolysis though the rate of decomposition is slow. As a result, the capacitance drops and the internal resistance rises slowly. Thus, the capacitor deteriorates. Finally, the capacitor can no longer be used. The decomposition rates of the electrolyte decreases sharply to an almost negligible level when the applied voltage to the capacitor is lowered below a certain voltage.

We have already proposed an example of a circuit for electrically charging an electric double layer capacitor in U.S. patent application Ser. No. 08/041,543.

The energy that can be stored in a capacitor is in proportion to the square of the charging voltage, i.e., $CV^2/2$, where C is the capacitance. Therefore, in order to increase the stored energy, the charging voltage should be made as high as possible.

SUMMARY OF THE INVENTION

It is an object of the present invention to provide a storage capacitor power supply which has selectable characteristics of longer life or higher storage power.

The above object is achieved in accordance with the teachings of the invention by a storage capacitor power supply equipped with an electric double layer capacitor and appropriately connected with a charger so as to be charged, the power supply being further equipped with a charging control circuit which is connected between the terminals of the capacitor and which, when the voltage developed across the terminals reaches a given value, stops charging. The charging control circuit can switch the maximum charging voltage across the terminals between at least two levels.

In the above-described structure, if an electrical double layer capacitor having a maximum working voltage, for example of 5 volts, is connected with the charger to charge the capacitor, the maximum charging voltage can be set to any desired value by means of the storage capacitor power supply.

In particular, if the charging voltage is set to 5 volts, the charging voltage is limited to and fully charged to 5 volts. If the maximum charging voltage is set to 4.45 volts (i.e., 89% of 5 volts), charging up to 80% of the rated power is conducted since 4.45 volts is regarded as a fully charged state.

Other objects and features of the invention will appear in the course of the description thereof which follows.

DETAILED DESCRIPTION OF THE INVENTION

Figure 1:
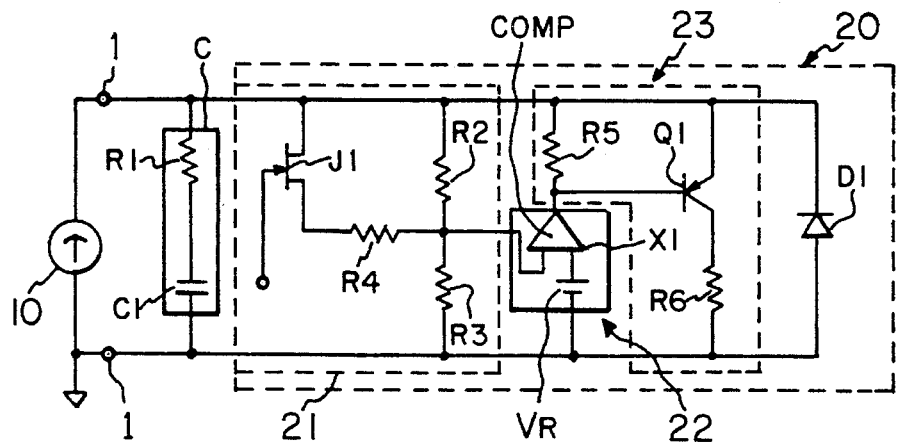
FIG. 1 is a circuit diagram of a storage capacitor power supply according to the invention.

Referring to FIG. 1, a storage capacitor power supply according to the invention is connected with an external charging power supply (charger) 10 via charging terminals 1. This power supply comprises an electric double layer capacitor C having a capacitance of C1 and an internal resistance of R1 together with a charging control circuit 20. When the capacitor C is charged from the charger 10, the charging control circuit 20 monitors the voltage developed across the terminals of the capacitor and controls the charging voltage. As an example, a regulated DC current source is used as the charger 10. After completion of the charging, the charger 10 is disconnected from the charging terminals 1.

The charging control circuit 20 comprises a monitor circuit 21 to sense the voltage developed across the terminals of the electric double layer capacitor C, a comparator circuit 22 for comparing a reference charging voltage with the output voltage from the monitor circuit 22, a current bypass circuit 23 for causing the charging current to bypass the capacitor C, and a protective Schottky diode D1. The charging control circuit 20 is supplied with an operating current and an operating voltage from the charger 10 or the capacitor C.

In this example, the monitor circuit 21 comprises voltage-dividing resistors R2 and R3 and a resistor R4 for changing the divider ratio. The resistors R2 and R3 are connected in series between the terminals of the capacitor C so as to detect the voltage across the terminals of the capacitor C. The resistor R4 can be connected in parallel with the voltage divider R2 via a junction field-effect transistor (JFET) J1 acting as a switching means.

When the JFET J1 is not conducting, the voltage developed across the terminals of the electric double layer capacitor C is divided at the ratio of the resistance of the resistor R2 to the resistance of the resistor R3. When the JFET J1 is conducting, the voltage is divided at the ratio of the resistance of the parallel combination of the resistors R2 and R4 to the resistance of the resistor R3.

Examples of switching means capable of acting instead of the JFET include bipolar transistors, MOSFETs, thyristors and semiconductor switches such as dedicated ICs in which those devices are packed at a high device density. A control signal for controlling the switching means is not limited to an electrical signal. The control signal may also be a light signal which is coupled by a photocoupler.

The comparator circuit 22 consists of a three-terminal shunt regulator X1 comprising an internal reference voltage source VR and a comparator circuit COMP. The comparator circuit 22 compares a reference charging voltage generated by the internal reference voltage source VR with the output from the monitor circuit 21.

The charging current bypass circuit 23 comprises a PNP transistor Q1, a base current limiting resistor R5 and a collector load resistor R6. The bypass circuit 23 is turned on and off by turning the shunt regulator X1 on and off. In this case, the emitter and the collector of the transistor Q1 are connected between the terminals of the electric double layer capacitor C. The three-terminal shunt regulator X1 comprises (1) the base current path for the transistor Q1, (2) the control terminal (of the regulator) connected to the voltage-dividers R2 and R3 (3) and a ground connection.

In the present example, the Schottky diode D1 is connected across the terminals 1 to protect the capacitor C and the circuit elements X1, Q1 from reverse voltage.

Figure 2:
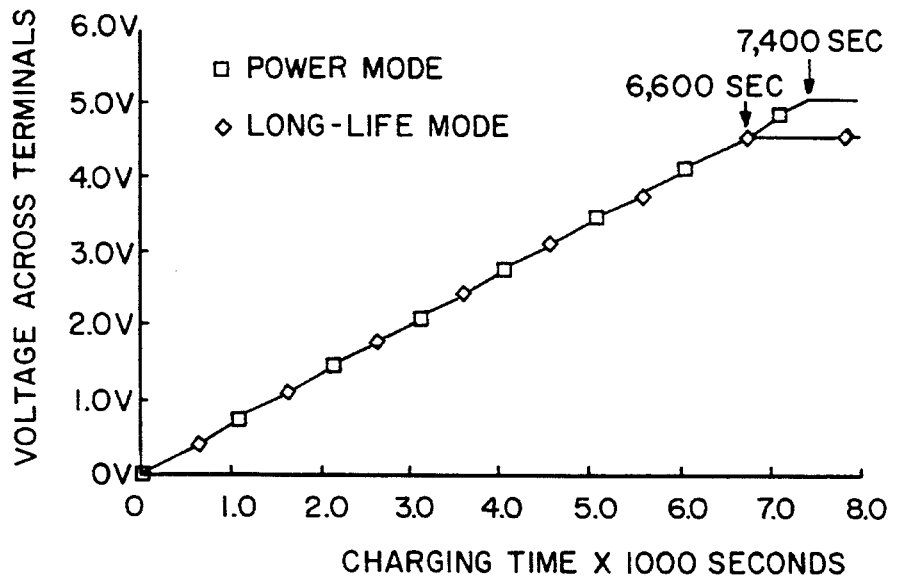
FIG. 2 is a graph showing the relation of the voltage developed across the terminals of the electric double layer capacitor shown in FIG. 1 to the charging time.

An operation for charging this storage capacitor power supply is now described by referring to the graph of FIG. 2 which shows the trace of the charged voltage. The electric double layer capacitor C has a rated voltage of 5 volts and a capacitance of 300 farads. The voltage-dividing resistors R2 and R3 have a resistance of 100 kΩ. The resistor R4 has a resistance of 355 kΩ. The three-terminal shunt regulator X1 has an internal reference voltage of 2.5 volts.

In the power mode, an "off" signal is supplied to the JFET J1 to bias off this JFET. Under this condition, electrical charging is conducted. If the capacitor C is charged at a current of 2 amperes for about 7,400 seconds from a completely discharged state, the voltage of the capacitor C builds up to 5 volts.

Concomitantly, the voltage divided by the resistors R2 and R3 reaches 2.5 volts and agrees with the reference voltage inside the three-terminal shunt regulator X1, thus turning on the regulator X1. This brings the transistor Q1 into conduction. The charging current which was supplied into the electric double layer capacitor from the power supply 10 flows through the transistor Q1 to thereby bypass the capacitor C. This charging into the capacitor C is stopped at a rated voltage of 5 volts. As a result, the maximum electrical power is stored in the electric double layer capacitor.

In the long-life mode, an "on" signal is applied to the gate of the JFET J1 to cause it to conduct. Under this condition, electrical charging is conducted. When the JFET J1 is conducting, the resistor R4 is connected in parallel with the resistor R2. The resistance of the parallel combination of these resistors R4 and R2 is about 78 kΩ. If the capacitor C is charged with a charging current of 2 amperes from the fully discharged state in the same way as in the power mode, the voltage developed across the terminals of the capacitor reaches 4.45 volts after about 6,600 seconds, as shown in FIG. 2. At this time, the voltage divided by the parallel combination of the resistors R2 and R4 and by the resistor R3 is 2.5 volts, thus turning on the shunt regulator X1. This brings the transistor Q1 into conduction. The result is that the charging current which was supplied into the electric double layer capacitor from the power supply 10 flows through the transistor Q1 to thereby bypass the capacitor C. Therefore, the charging into the capacitor C is stopped at 4.45 volts, or 89% of the rated voltage of 5 volts. In this state, an electric power of about 80% of the electric power stored in the power mode is accumulated in the electric double layer capacitor C. The time required for the charging is shortened by about 10% compared with the time required for the charging in the power mode.

In this way, in the above example, the charging voltage is switched between 5 volts and 4.45 volts, i.e., between 100% and 89% of the rated voltage, as the need arises. These numerical values can be modified, depending on the circumstances and on the purposes. For example, where it is necessary to increase the lifetime, the lower charging voltage may be set to 84% of the rated voltage. In this case, the electric power which can be stored in the electric double layer capacitor is 70% of the maximum storable electric power.

An especially large output power may be necessary in rare cases, in which cases the upper charging voltage can be set to 110% of the rated voltage for a short period of time, and the capacitor is to be charged immediately prior to the use of the capacitor.

In any case, the capacitor can be used safely with longer life by setting the maximum charged voltage at, for example, 80–95% of the rated voltage. If it is necessary to fully charge the capacitor in the power mode after the capacitor has been once charged in the long-life mode, the time required for the additional charging is only 10 to 30% of the time taken to charge the capacitor in the power mode from the beginning.

Figure 3:
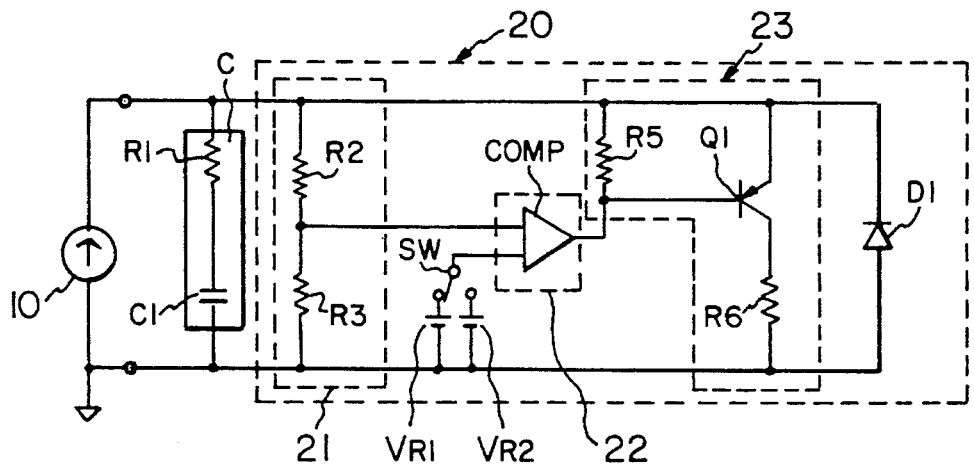
FIG. 3 is a circuit diagram of another storage capacitor power supply according to the invention.

The charging control circuit 20 can be modified variously. FIG. 3 shows a modification of the charging control circuit. In this example, the attenuation factor of the monitor circuit is maintained constant. Instead, two reference voltage sources VR1 and VR2 for generating different reference voltages are provided. The reference voltage supplied to the comparator circuit COMP is switched between the two voltages by a switch SW. The charging can be stopped at different voltages across the terminals by appropriately selecting the output voltages from the voltage sources VR1 and VR2.

Figure 4:
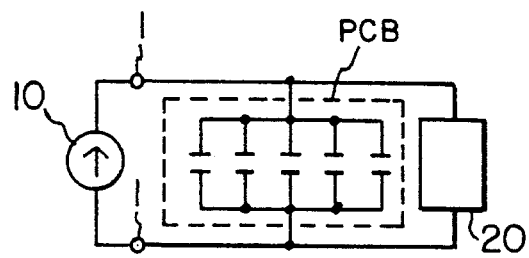
FIG. 4 is a circuit diagram of a further storage capacitor power supply according to the invention.

Since only one electric double layer capacitor C provides neither a sufficient capacitance nor a sufficient maximum working voltage, plural electric double layer capacitors are connected in parallel, in series, or any desired series-parallel combination so that the capacitors may be used as a capacitor block or capacitor structure. Where a capacitor block PCB consisting of a parallel combination of plural electric double layer capacitors is used, one charging control circuit is provided for the capacitor block PCB. FIG. 4 shows an example of this configuration. In the present example, all the electric double layer capacitors are connected in parallel and can be substantially regarded as one capacitor. Therefore, the charging control circuit 20 operates in exactly the same manner as the charging control circuit of the examples described already in connection with FIGS. 1 and 3. At the end of the charging, the charged voltages of the capacitors are equal, and the electric power stored in the individual capacitors is proportional to their respective capacitance.

Figure 5:
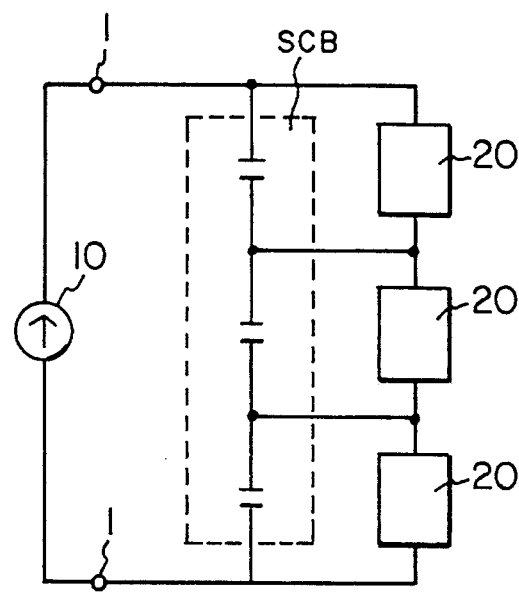
FIG. 5 is a circuit diagram of yet another storage capacitor power supply according to the invention.

FIG. 5 shows a further storage capacitor power supply according to the invention. This power supply is equipped with a capacitor block SCB in which plural electric double layer capacitors are connected in series. This block SCB is charged by a single external power supply via charging terminals 1. In the present example, one charging control circuit is provided for each one of the capacitors connected in series. Therefore, if the capacitors differ in capacitance, the charging is stopped by an individual charging control circuit when a respective capacitor is charged to a given amount to prevent any single capacitor from being overcharged.

Figure 6:
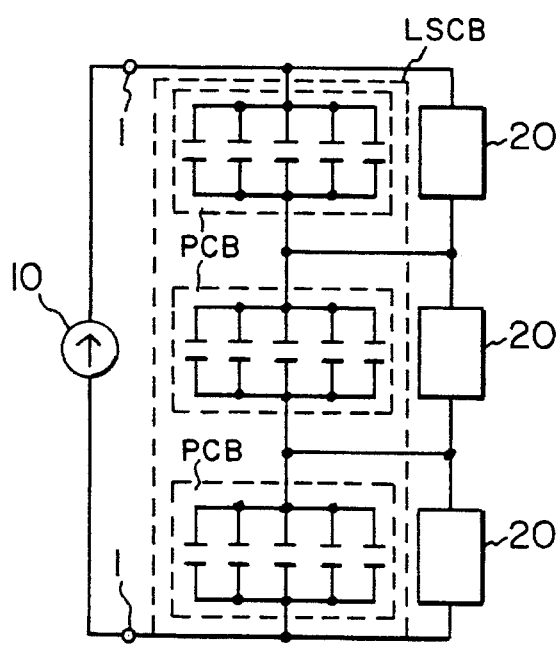
FIG. 6 is a circuit diagram of still another storage capacitor power supply according to the invention.

FIG. 6 shows yet another storage capacitor power supply according to the invention. In the present example, plural electric double layer capacitors are connected in parallel to a form a capacitor block PCB. Such capacitor blocks PCB are connected in series to form a large-scale capacitor block structure LSCB. This capacitor block structure LSCB is charged by a charger 10 via a pair of charging terminals 1. In the present example, one charging control circuit is provided for each one capacitor block PCB consisting of electric double layer capacitors connected in parallel.

Figure 7:
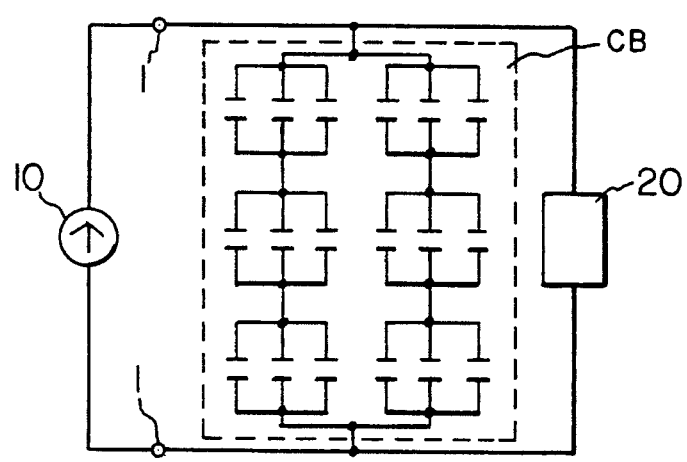
FIG. 7 is a circuit diagram of an additional storage capacitor power supply according to the invention.

FIG. 7 shows still another storage capacitor power supply according to the invention. In the present example, the electric double layer capacitor C is replaced by a capacitor block CB consisting of plural electric double layer capacitors connected in series, in parallel, or in any series-parallel combination. One charging control circuit 20 is provided for this structure CB. The present example is suited for cases in which capacitors connected in series do not differ widely in capacitance.

As described thus far, in the present invention, the voltage at which the electric double layer capacitor is charged can be switched between plural levels by means of the novel storage capacitor power supply. When the capacitor is charged by an ordinary charger and in a steady state, the charging voltage is restricted to, for example, about 80 to 95% of the rated voltage. Only in special cases, the capacitor can be fully charged to 100% of the rated voltage. Therefore, the electric double layer capacitor can be expected to have a safer and longer life.

Having thus described my invention with the detail and particularity required by the Patent Laws, what is claimed and desired to be protected by Letters Patent is set forth in the following claims.

What is claimed is:

1. A power supply comprising an electric double layer capacitor and capable of being detachably connected to an external power supply so as to charge said capacitor comprising:
   said electric double layer capacitor having a pair of terminals;
   at least one charging control circuit which is connected between said terminals of said electric double layer capacitor and which, when a voltage developed across said terminals reaches a stop value, stops charging of said capacitor; and
   means for said charging control circuit to switch said stop value between at least two levels.

2. The storage capacitor power supply of claim 1, wherein said charging control circuit comprises:
   a comparator circuit for comparing a voltage proportional to said voltage developed across said terminals of said electric double layer capacitor with a reference voltage; and
   a charging current bypass circuit which receives an output from said comparator circuit and which, when said electric double layer capacitor is being charged by said external power supply, if a signal corresponding to said voltage across said terminals reaches or exceeds said reference voltage, stops said charging current from being supplied to said electric double layer capacitor and causes said charging current to bypass said capacitor.

3. The storage capacitor power supply of claim 2, wherein said means for switching said stop value between at least two levels produces two monitor signals by causing said voltage across said terminals to attenuate by two ratios and supplying one or the other of said signals to said comparator circuit.

4. The storage capacitor power supply of claim 2, wherein said charging control circuit is equipped with a means for producing two different reference voltages selectively for said electric double layer capacitor when said storage capacitor power supply is connected with said external power supply, and wherein said means for switching supplies said selectively produced reference voltages to said comparator circuit so as to be capable of switching said stop value between at least two levels.

5. The storage capacitor power supply of any one of claims 1 to 4, wherein said charging control circuit is supplied with an operating current and an operating voltage from said external power supply or said capacitors.

6. The storage capacitor power supply of any one of claims 1 to 4, wherein a parallel combination of plural electrical double layer capacitors can be connected with said external power supply via a pair of connection terminals, and wherein said charging control circuit controls said parallel combination of the electric double layer capacitors.

7. The storage capacitor power supply of any one of claims 1 to 4, wherein a large-scale capacitor block structure consisting of a series combination of capacitor blocks can be connected with said external power supply via a pair of connection terminals, each of said capacitor blocks consisting of a parallel combination of electric double layer capacitors, and wherein said at least one charging control circuits are plural in number and each one of said charging control circuits is provided for each one of said capacitor blocks.

8. The storage capacitor power supply of any one of claims 1 to 4, wherein a capacitor block consisting of a series combination of electric double layer capacitors can be connected with said external power supply via a pair of connection terminals, and further comprising charging control circuits provided for each of said electric double layer capacitors, respectively.

9. The storage capacitor power supply of any one of claims 1 to 4, wherein plural electric double layer capacitors are connected in series, in parallel, or in any series-parallel combination to form a capacitor block which can be connected with said external power supply, and wherein said charging control circuit controls said capacitor block.

10. The storage capacitor power supply of any one of claims 1 to 4, wherein a large-scale capacitor block structure consisting of plural capacitor blocks connected in series, in parallel, or in any series-parallel combination can be connected with said external power supply, each of said capacitor blocks consisting of electric double layer capacitors connected in series, in parallel, or in any series-parallel combination, and wherein said at least one charging control circuit is plural in number and each one of said charging control circuits is provided for each one of said capacitor blocks forming said large-scale capacitor block.

11. A method of using the storage capacitor power supply of claim 1 comprising the steps for connecting a parallel combination of plural electric double layer capacitors with said external power supply via a pair of connection terminals, wherein said charging control circuit controls said parallel combination of the electric double layer capacitors.

12. A method of using the storage capacitor power supply of claim 1 comprising the steps for connecting a large-scale capacitor block structure consisting of a series combination of capacitor blocks with said external power supply via a pair of connection terminals, each of said capacitor blocks consisting of a parallel combination of electric double layer capacitors, further comprising charging control circuits provided for each one of said capacitor blocks.

13. A method of using the storage capacitor power supply of claim 1 comprising the steps for connecting a capacitor block consisting of a series combination of electric double layer capacitors with said external power supply via a pair of connection terminals, wherein said at least one charging control circuits are plural in number and provided for said electric double layer capacitors, respectively.

14. A method of using the storage capacitor power supply of claim 1 comprising the steps for connecting plural electric double layer capacitors in series, in parallel, or in any series-parallel combination to form a capacitor block and connecting said external power supply, wherein said charging control circuit controls said capacitor block.

15. A method of using the storage capacitor power supply of claim 1 comprising the steps for connecting a large-scale capacitor block structure consisting of plural capacitor blocks connected in series, in parallel, or in any series-parallel combination, and connecting said block structure with said external power supply, each of said capacitor blocks consisting of electric double layer capacitors connected in series, in parallel, or in any series-parallel combination, further comprising charging control circuit provided for each one of said capacitor blocks forming said large-scale capacitor block.

\* \* \* \* \*

UNITED STATES PATENT AND TRADEMARK OFFICE
CERTIFICATE OF CORRECTION

PATENT NO. : 5,528,121
DATED : June 18, 1996
INVENTOR(S) : Michio Okamura

It is certified that error appears in the above-indentified patent and that said Letters Patent is hereby corrected as shown below:

Title page, item [57] col. 2,
Abstract Line 8 "set of" should read --set to--.

Claim 7 Line 52 Column 6 "one charging" should read --one of said charging--.

Claim 13 Line 5 Column 8 "one charging" should read --one of said charging--.

Signed and Sealed this

Twenty-fourth Day of September, 1996

Attest:

BRUCE LEHMAN

Attesting Officer     Commissioner of Patents and Trademarks